United States Patent
Miura et al.

(10) Patent No.: US 7,519,296 B2
(45) Date of Patent: Apr. 14, 2009

(54) OPTICAL DEMULTIPLEXING METHOD AND OPTICAL MULTIPLEXING METHOD, AND OPTICAL TRANSMISSION APPARATUS USING SAME

(75) Inventors: Akira Miura, Kawasaki (JP); Hiroki Ooi, Kawasaki (JP); Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 516 days.

(21) Appl. No.: 11/017,941

(22) Filed: Dec. 22, 2004

(65) Prior Publication Data

US 2006/0062577 A1   Mar. 23, 2006

(30) Foreign Application Priority Data

Sep. 17, 2004   (JP) .............................. 2004-270862

(51) Int. Cl.
   H04J 14/02   (2006.01)
(52) U.S. Cl. ........................................................ 398/82
(58) Field of Classification Search ............... 398/79–97
   See application file for complete search history.

(56) References Cited

U.S. PATENT DOCUMENTS

| | | | |
|---|---|---|---|
| 6,310,690 B1 * | 10/2001 | Cao et al. .................... | 356/519 |
| 6,404,525 B1 | 6/2002 | Shimomura et al. | |
| 6,504,970 B2 | 1/2003 | Doerr | |
| 6,549,699 B2 | 4/2003 | Belser et al. | |
| 6,810,215 B1 | 10/2004 | Oikawa | |
| 7,003,227 B2 * | 2/2006 | Kim et al. ..................... | 398/82 |
| 2002/0131116 A1 | 9/2002 | Shimomura et al. | |
| 2002/0131684 A1 | 9/2002 | Doerr | |
| 2003/0215233 A1 * | 11/2003 | Tomofuji et al. .............. | 398/41 |
| 2004/0037499 A1 | 2/2004 | Okuno | |
| 2004/0202473 A1 | 10/2004 | Nakamura et al. | |

FOREIGN PATENT DOCUMENTS

| | | |
|---|---|---|
| EP | 1 146 681 A2 | 10/2001 |
| JP | 11-55700 | 2/1999 |
| JP | 2001-036479 | 2/2001 |
| JP | 2001-345784 | 12/2001 |
| JP | 2002-112294 | 4/2002 |
| JP | 2002-323683 | 11/2002 |
| JP | 2004-140782 | 5/2004 |

OTHER PUBLICATIONS

Office Action mailed on Feb. 26, 2008 and issued in corresponding Japanese Patent Application No. 2004-270862.

* cited by examiner

*Primary Examiner*—Quan-Zhen Wang
(74) *Attorney, Agent, or Firm*—Staas & Halsey LLP (57) ABSTRACT

According to the present invention, for example, a WDM light containing 10 Gbit/s signal lights and 40 Gbit/s signal light arranged on wavelength grids at 25 GHz intervals is branched into two by an input side optical coupler to be sent to two routes. In one route side, only the 10 Gbit/s signal lights are demultiplexed by a 10 Gbit/s demultiplexer and a plurality of 1×2 optical switches, while in the other route side, only the 40 Gbit/s signal lights are demultiplexed by a 40 Gbit/s demultiplexer and a plurality of 1×2 optical switches. Further, the respectively demultiplexed signal lights are multiplexed for each modulating rate by a 10 Gbit/s multiplexer and a 40 Gbit/s multiplexer, and thereafter, further multiplexed by an output side optical coupler to become a WDM light. Thus, it becomes possible to arrange signal lights having different modulating rates at arbitrary wavelengths on wavelength grids at predetermined intervals.

14 Claims, 10 Drawing Sheets

RELATED ART

FIG.14

RELATED ART

OPTICAL DEMULTIPLEXING METHOD AND OPTICAL MULTIPLEXING METHOD, AND OPTICAL TRANSMISSION APPARATUS USING SAME

BACKGROUND OF THE INVENTION

1. Field of the Invention

The present invention relates to an optical demultiplexing method and an optical multiplexing method suitable for an optical transmission system which transmits a wavelength division multiplexed (WDM) light containing a plurality of signal lights of different wavelengths, and an optical transmission apparatus using the same, and in particular, relates to a technology for multiplexing/demultiplexing signal lights having different modulation rates.

2. Description of the Related Art

Figure 13:
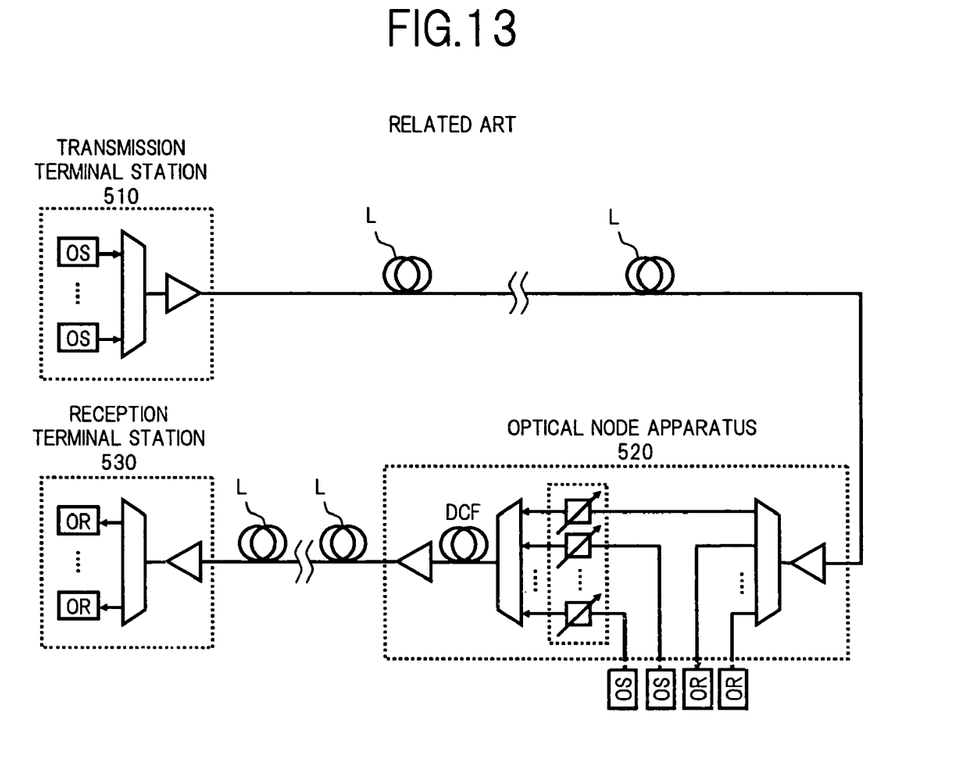
FIG. 13 is a schematic diagram showing one example of a configuration of a typical WDM optical transmission system.

FIG. 13 is a schematic diagram showing one example of a configuration of a typical WDM optical transmission system. In this WDM optical transmission system, signal lights of different wavelengths output from a plurality of optical senders (OS) are wavelength division multiplexed by an optical multiplexer in a transmission terminal station 510, and thereafter, such a WDM light is amplified by an optical post-amplifier to be transmitted to an optical fiber transmission path L. Further, in an optical node apparatus 520 arranged on the optical fiber transmission path L, there are performed the optical add/drop multiplexing (OADM) of signal light of required wavelength on the WDM light being propagated through the optical fiber transmission path L, the wavelength dispersion compensation and/or the polarization mode dispersion compensation on the signal light waveform deteriorated due to the transmission, the compensation of power deviation among signal lights of respective wavelengths, and the like. Then, in a reception terminal station 530, the WDM light transmitted on the optical fiber transmission path L is amplified by an optical pre-amplifier, and thereafter, demultiplexed to each one wavelength by an optical demultiplexer to be received by optical receivers (OR) corresponding to the respective wavelengths. In such a WDM optical transmission system, the technique for multiplexing or demultiplexing the signal lights of respective wavelengths is required in the transmission terminal station 510, the optical node apparatus 520 and the reception terminal station 530.

For the WDM optical transmission system as described above, there increase demands for a system which wavelength division multiplexes signal lights having different modulating rates, to transmit a WDM light. As a conventional system satisfying these demands, there has been proposed a WDM optical communication system capable of efficiently arranging signal lights of a plurality of bit rates at different wavelength spacing (for example, 10 Gbit/s signal lights arranged at 50 GHz intervals, 40 Gbit/s signal lights arranged at 100 GHz intervals, and the like) (refer to Japanese Unexamined Patent Publication No. 2002-112294 and Japanese Unexamined Patent Publication No. 2001-345784).

In the case of the system which performs the WDM transmission of the signal lights having different modulating rates, as described above, since spectral bandwidths of the signal lights are different from each other depending on the modulating rates (bit rates) of the signal lights, any device needs to be made when the multiplexing/demultiplexing of the signal lights is performed. Namely, as one technology for multiplexing/demultiplexing the signal lights at high density arrangement intervals, such as 50 GHz and the like, there has been known a method in which the signal lights multiplexed/demultiplexed using, for example, an arrayed waveguide grating (AWG), a multi-layer film filter or the like, are further multiplexed/demultiplexed using an interleaver. When the signal lights are multiplexed/demultiplexed utilizing the interleaver, if the signal lights having different modulating rates are multiplexed/demultiplexed by the common interleaver, since the spectral bandwidths of the signal lights are different from each other according to the modulating rates, there is caused a problem in that signal qualities are deteriorated. Note, the interleaver is an optical multiplexer/demultiplexer having a function of demultiplexing a signal group at the certain wavelength spacing into even number channels and odd number channels to make a signal group having the wavelength spacing twice the above certain wavelength spacing, or contrary to the above, a function of multiplexing the even number channels and the odd number channels to make a signal group having the wavelength spacing half the above certain wavelength spacing.

To be specific, for example in a system which arranges 10 Gbit/s signal lights arranged at 50 GHz intervals to perform the WDM transmission, in the case of changing bit rates of part of the signal lights to 40 Gbit/s to upgrade the system (to increase the capacity of the system), if the WDM light is multiplexed/demultiplexed utilizing an interleaver of 50 GHz/100 GHz intervals corresponding to the 10 Gbit/s signal lights, since the spectral bandwidth of 40 Gbit/s signal light is wider than the spectral bandwidth of the 10 Gbit/s signal light, a signal component of 40 Gbit/s is leaked into an adjacent channel (crosstalk) and also the spectrum itself of the 40 Gbit/s signal light is subjected to the band restriction by the interleaver. On the other hand, in the case of using an interleaver of 100 GHz/200 GHz intervals corresponding to the 40 Gbit/s signal lights, although there is not caused a problem of crosstalk or band restriction, since the 10 Gbit/s signal lights are also transmitted at 100 GHz intervals, the frequency utilization efficiency is lowered so that an effect of upgrading cannot be achieved.

In order to avoid the above problems, in the invention disclosed in Japanese Unexamined Patent Publication No. 2001-345784, transmission characteristics corresponding to respective ports of the interleaver are devised so as to be asymmetrical with each other. Further, the present inventors have proposed a technology for combining to use a plurality of interleavers whose center frequencies in transmission bands are shifted to each other (refer to Japanese Patent Application No. 2003-083984) as shown in FIG. 14 for example.

Figure 14:
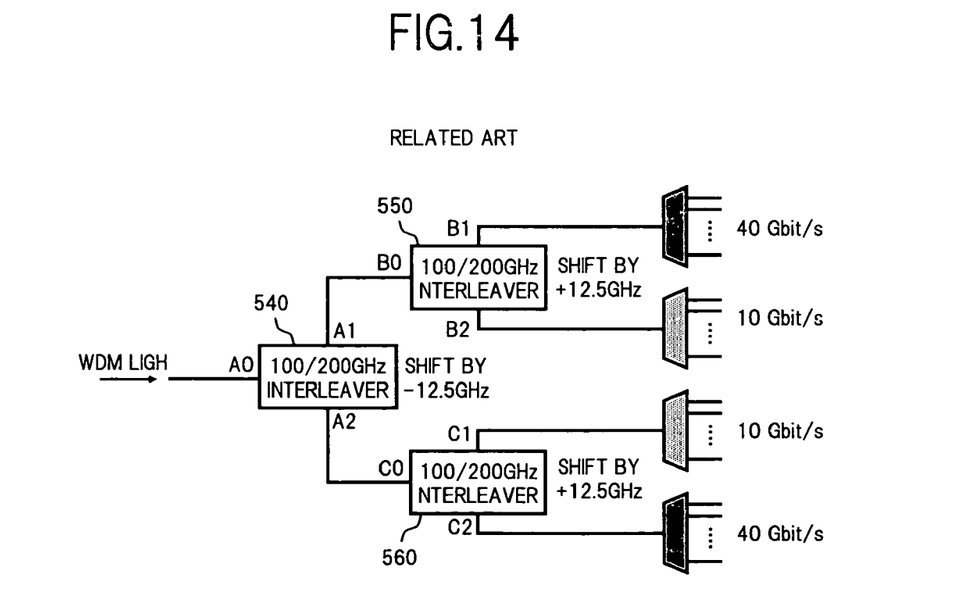
FIG. 14 is a diagram showing a configuration example of a prior invention.

Briefly explaining the summary of the prior invention referring to a configuration example of FIG. 14, in a WDM light given to an interleaver 540 of 100 GHz/200 GHz intervals, the 10 Gbit/s signal lights in 25 GHz bandwidth are arranged in the odd number channels and the 40 Gbit/s signal lights in 75 GHz bandwidth are arranged in the even number channels. This WDM light is demultiplexed by the interleaver 540, and thereafter, is further demultiplexed by interleavers 550 and 560 of 100 GHz/200 GHz intervals. Center frequencies in transmission bands of a port A1 of the interleaver 540 and a port B1 of the interleaver 550 are shifted by ±12.5 GHz from a center frequency of the 10 Gbit/s signal light, so that an overlapped portion of respective transmission bands of both ports is substantially coincident with a signal band of channel ch[4i-2] (i: integer of 1 or more). As a result, only the 40 Gbit/s signal light of the channel ch[4i-2] is taken out from the port B1. Further, overlapped portions of transmission bands of other ports are similarly set so as to be substantially coincident with signal bands of channels desired to be taken out.

However, in the multiplexing/demultiplexing technology corresponding to the signal lights having different modulating rates as described above, since the modulating rates are previously determined depending on wavelengths (frequencies) of the signal lights, there is a problem in that the modulating rates of the signal lights of respective wavelengths cannot be freely set.

SUMMARY OF THE INVENTION

The present invention has been accomplished in view of the above problems and has an object to provide an optical demultiplexing method and an optical multiplexing method capable of arranging signal lights having different modulating rates at arbitrary wavelengths on wavelength grids at predetermined intervals, and an optical transmission apparatus using the same.

In order to achieve the above object, according to the present invention, there is provided an optical demultiplexing method for demultiplexing a wavelength division multiplexed light containing a plurality of signal lights having different modulating rates which are arranged on wavelength grids at predetermined intervals, wherein the wavelength division multiplexed light is branched by an optical coupler to be sent to a plurality of routes respectively corresponding to the different modulating rates, the respective lights sent to the plurality of routes are respectively demultiplexed using demultiplexers having transmission bands whose center wavelengths are set on the wavelength grids while maintaining intervals corresponding to modulating rates of the routes, and optical paths on optical switches connected to respective output ports of the demultiplexers are changed over according to the setting of wavelengths and modulating rates of the respective signal lights contained in the wavelength division multiplexed light, to transmit the signal lights having the modulating rates corresponding to the demultiplexers but to block the signal lights having other modulating rates, among the signal lights output from the respective output ports of the demultiplexers.

Further, according to the present invention, there is provided an optical multiplexing method for multiplexing a plurality of signal lights having different modulating rates which are arranged on wavelength grids at predetermined intervals, wherein the plurality of signal lights are sent to a plurality of routes respectively corresponding to the different modulating rates, and when the respective lights sent to the plurality of routes are respectively multiplexed using multiplexers having transmission bands whose center wavelengths are set on the wavelength grids while maintaining intervals corresponding to modulating rates of the routes, only the signal lights having the modulating rates corresponding to the multiplexers are given to respective input ports of the multiplexers, and the lights respectively multiplexed by the respective multiplexers on the plurality of routes are further multiplexed by an optical coupler.

Furthermore, according to the present invention, there is provided an optical transmission apparatus for transmitting a wavelength division multiplexed light containing a plurality of signal lights having different modulating rates which are arranged on wavelength grids at predetermined intervals, including at least one of a demultiplexing section that demultiplexes the wavelength division multiplexed light and a multiplexing section that multiplexes the plurality of signal lights input thereto. Then, the demultiplexing section comprises: an optical coupler branching the wavelength division multiplexed light to send the branched lights to a plurality of routes respectively corresponding to the different modulating rates; a plurality of demultiplexers respectively demultiplexing the lights sent to the plurality of routes by the optical coupler in accordance with transmission bands whose center wavelengths are set on the wavelength grids while maintaining intervals corresponding to modulating rates of the routes, a plurality of optical switches connected to respective output ports of the respective demultiplexers, and a control section that changes over optical paths on the plurality of optical switches according to the setting of wavelengths and modulating rates of the respective signal lights contained in the wavelength division multiplexed light, to transmit the signal lights having the modulating rates corresponding to the demultiplexers but to block the signal lights having other modulating rates, among the signal lights output from respective output ports of the plurality of demultiplexers. Further, the multiplexing section comprises: a plurality of multiplexers respectively multiplexing the plurality of signal lights sent to the plurality of routes respectively corresponding to the different modulating rates in accordance with transmission bands whose center wavelengths are set on the wavelength grids while maintaining intervals corresponding to the modulating rates of the routes; an input control section that gives only the signal lights having the modulating rates corresponding to the multiplexers to respective input ports of the multiplexers; and an optical coupler further multiplexing the lights respectively multiplexed by the plurality of multiplexers.

According to the optical demultiplexing method, the optical multiplexing method and the optical transmission apparatus of the present invention as described in the above, the plurality of signal lights having different modulating rates are efficiently arranged at arbitrary wavelengths on the wavelengths grids at predetermined intervals, and therefore, the multiplexing/demultiplexing of the signal lights is reliably performed without an influence of crosstalk or band restriction.

As described in the above, according to the present invention, it is possible to realize an optical demultiplexing method and an optical multiplexing method capable of arranging a plurality of signal lights having different modulating rates at arbitrary wavelengths on wavelengths grids at predetermined intervals. Thus, it becomes possible to transmit economically and flexibly a WDM light of large capacity while maintaining excellent signal qualities, by applying the optical demultiplexing method and the optical multiplexing method according to the present invention to various optical transmission apparatuses, such as an optical node apparatus, transmission/reception terminal station and the like, which constitute an optical transmission system.

Other objects, features and advantages of the present invention will become apparent from the following explanation of the embodiments, in conjunction with the appended drawings.

DESCRIPTION OF THE PREFERRED EMBODIMENTS

There will be described embodiments for implementing the present invention, with reference to the accompanying drawings. The same reference numerals denote the same or equivalent parts in all drawings.

Figure 1:
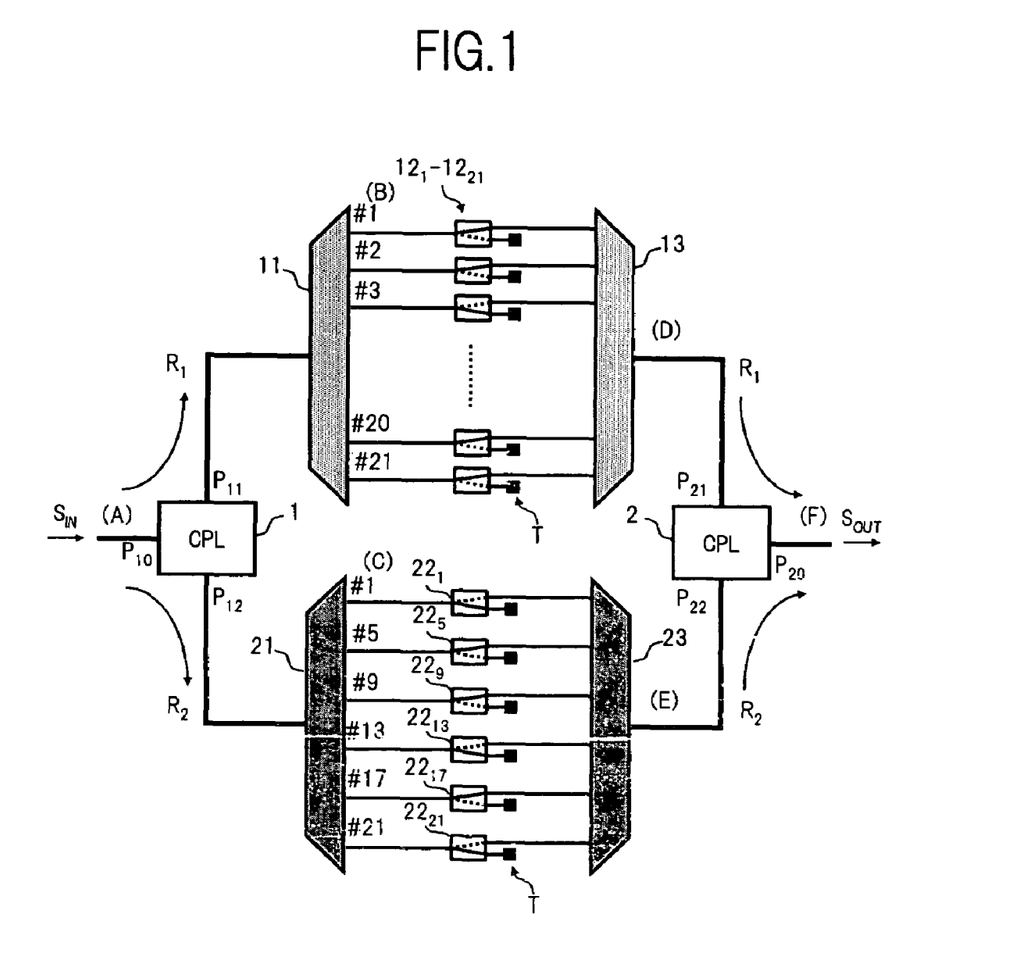
FIG. 1 is a diagram for explaining a basic theory of an optical demultiplexing method and an optical multiplexing method according to the present invention.

FIG. 1 is a diagram for explaining a basic theory of an optical demultiplexing method and an optical multiplexing method according to the present invention. Here, the explanation will be made, for example, on the assumption that a WDM light mixedly containing 10 Gbit/s signal lights and 40 Gbit/s signal lights is once demultiplexed and then, again multiplexed.

At first, a WDM light SIN given from the left side of FIG. 1 is input to a port $P_{10}$ of an optical coupler 1. In the optical coupler 1, the input light is branched into two, and one branched light is output to a route $R_1$ on the upper side of the figure via a port $P_{11}$, while the other branched light is output to a route $R_2$ on the lower side of the figure via a port $P_{12}$. To the route $R_1$ side, a 10 Gbit/s demultiplexer 11, 1×2 optical switches $12_1$ to $12_{21}$ and a 10 Gbit/s multiplexer 13 are connected, and to the route $R_2$ side, a 40 Gbit/s demultiplexer 21, 1×2 optical switches $22_1$, $22_5$, $22_9$, $22_{13}$, $22_{17}$ and $22_{21}$, and a 40 Gbit/s multiplexer 23 are connected, so that output lights from the multiplexers 13 and 23 on the routes $R_1$ and $R_2$ are given respectively to ports $P_{21}$ and $P_{22}$ of an optical coupler 2 to be multiplexed, and a WDM light Sour is output from a port 20.

Figure 2:
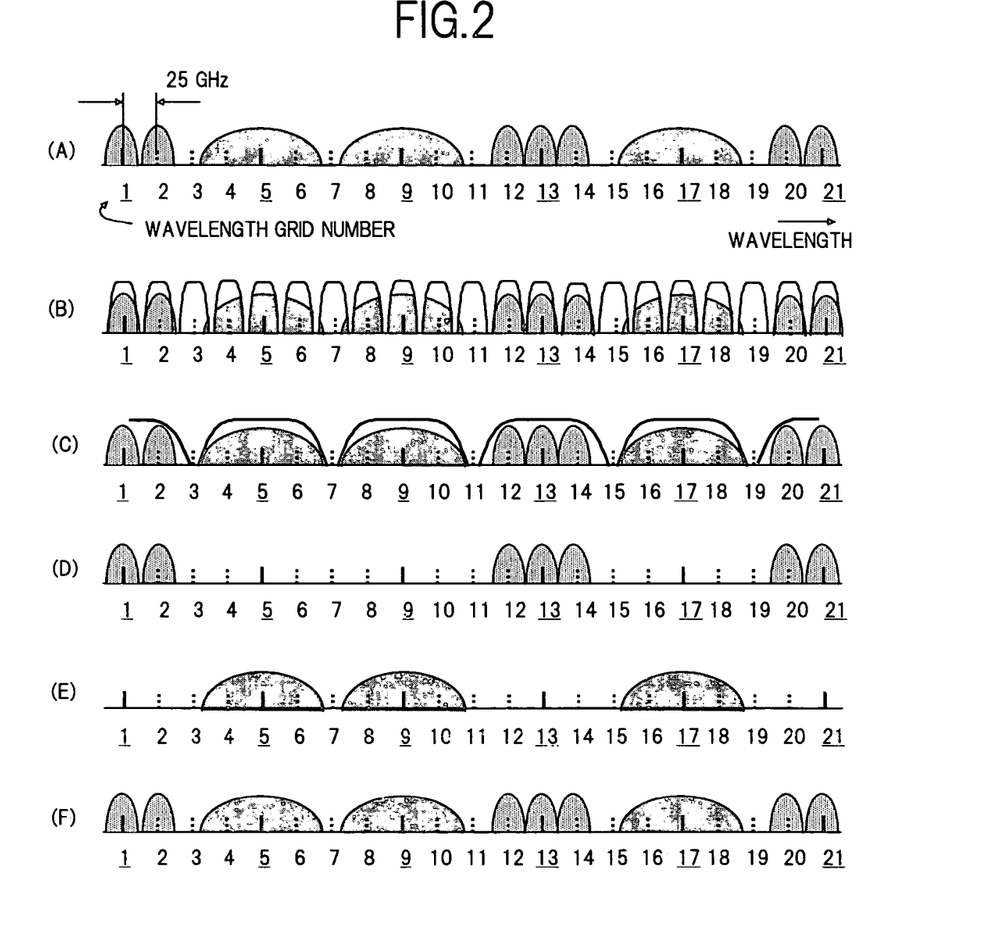
FIG. 2 is a diagram showing one example of a spectrum at each point in FIG. 1.

FIG. 2 shows one example of a spectrum at each of points A to F in the configuration of FIG. 1. Note, the point A is an input end of the optical coupler 1, the point B is an output end of the 10 Gbit/s demultiplexer 11, the point C is an output end of the 40 Gbit/s demultiplexer 21, the point D is an output end of the 10 Gbit/s multiplexer 13, the point E is an output end of the 40 Gbit/s multiplexer 23 and the point F is an output end of the optical coupler 2.

In the WDM light $S_{IN}$ input to the port $P_{10}$ of the optical coupler 1, as shown in (A) of FIG. 2 for example, 10 Gbit/s signal lights are arranged in wavelength grid numbers 1, 2, 12, 13, 14, 20 and 21, and 40 Gbit/s signal lights are arranged in wavelength grid numbers 5, 9 and 17, on wavelength grids at 25 GHz intervals. Note, it is possible to arrange the 10 Gbit/s signal lights in all of the wavelength grid numbers in FIG. 2. On the other hand, the 40 Gbit/s signal light has the spectral bandwidth four times the spectral bandwidth of the 10 Gbit/s signal light, and therefore, needs to be arranged on the wavelength grids at 25 GHz intervals while maintaining at least 100 GHz intervals. Therefore, the wavelength grid numbers on which the 40 Gbit/s signal lights can be arranged are, for example, 1, 5, 9, 13, 17, 21 and the like, at 100 GHz intervals.

The WDM light $S_{IN}$ mixedly containing the signal lights of two modulating rates is branched for two routes $R_1$ and $R_2$ by the optical coupler 1, and thereafter, the branched lights are given to the 10 Gbit/s demultiplexer 11 and the 40 Gbit/s demultiplexer 21. As a result, output spectra of the 10 Gbit/s demultiplexer 11 and the 40 Gbit/s demultiplexer 21 each mixedly contains signal lights of two modulating rates, as shown in (B) and (C) of FIG. 2. Note, the bold lines in (B) of FIG. 2 show transmission bands of 10 Gbit/s demultiplexer 11 respectively corresponding to the wavelength grid numbers 1 to 21, and the bold lines in (C) of FIG. 2 show transmission bands of 40 Gbit/s demultiplexer 21 respectively corresponding to the wavelength grid numbers 1, 5, 9, 13, 17 and 21.

Therefore, the 1×2 optical switches $12_1$ to $12_{21}$ disposed to respective outputs of the 10 Gbit/s demultiplexer 11 are set so that only channels in which the 10 Gbit/s signal lights are arranged, are given to the latter staged 10 Gbit/s multiplexer 13 but other channels are all blocked. Further, similarly to this, the 1×2 optical switches $22_1$, $22_5$, $22_9$, $22_{13}$, $22_{17}$ and $22_{21}$ disposed to respective outputs of the 40 Gbit/s demultiplexer 21 are set so that only channels in which the 40 Gbit/s signal lights are arranged, are given to the latter staged 40 Gbit/s multiplexer 23 but other channels are all blocked.

To be specific, on the route $R_1$ side here, optical paths of the respective 1×2 optical switches corresponding to the wavelength grid numbers 1, 2, 12, 13, 14, 20 and 21 are set to the side of the route connected to the 10 Gbit/s multiplexer 13, and optical paths of the respective 1×2 optical switches corresponding to the other wavelength grid numbers 3 to 11 and 15 to 19 are set to the side of an optical terminator T. Further, on the route $R_2$ side, the optical paths of the respective 1×2 optical switches corresponding to the wavelength grid numbers 5, 9 and 17 are set to the side of the route connected to the 40 Gbit/s multiplexer 23, and the optical paths of the respective 1×2 optical switches corresponding to the other wavelength grid numbers 1, 13 and 21 are set to the side of the optical terminator T. Note, the optical terminator T is used for preventing Fresnel reflection.

As a result that the optical paths on the respective 1×2 optical switches are set in the above manner, in an output spectrum of each of the 10 Gbit/s multiplexer 13 and the 40 Gbit/s multiplexer 23, either the 10 Gbit/s signal lights or the 40 Gbit/s signal lights exist, as shown in (D) of FIG. 2 and (E) of FIG. 2. Then, the respective output spectra from the 10 Gbit/s multiplexer 13 and the 40 Gbit/s multiplexer 23 are again multiplexed by the optical coupler 2, so that the WDM light $S_{OUT}$ mixedly containing the 10 Gbit/s signal lights and the 40 Gbit/s signal lights as shown in (F) of FIG.2 is output from the optical coupler 2.

Figure 3:
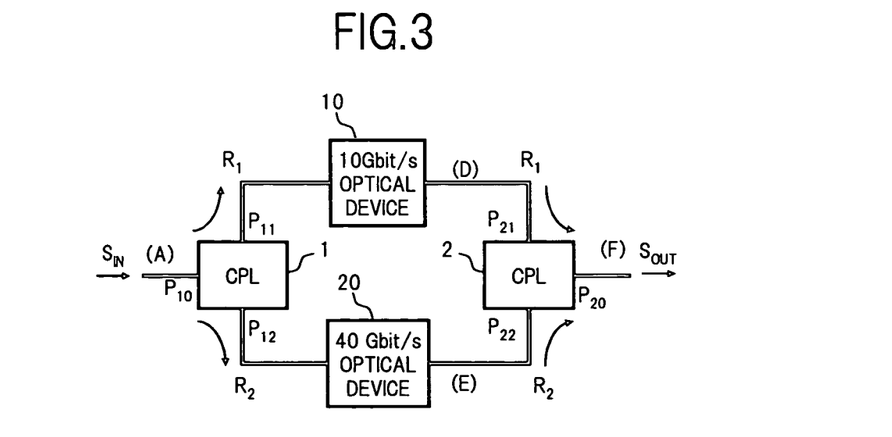
FIG. 3 is a diagram showing another configuration example related to FIG. 1.

The optical demultiplexing method and the optical multiplexing method according to the present invention as described in the above can also be realized, as shown in FIG. 3 for example, by respectively disposing, on the respective routes $R_1$ and $R_2$, known optical devices 10 and 20, each utilizing a wavelength blocker, a wavelength selector switch or the like which is capable of selecting signal lights of arbitrary wavelengths among a plurality of signal lights contained in an input WDM light to output the selected signal lights as a WDM light. In this configuration of FIG. 3, spectra at respective points A, D, E and F are the same as the spectra shown in (A), (D), (E) and (F) of FIG. 2. As a specific example of the known optical devices 10 and 20, it is possible to apply a configuration shown in FIG. 2 of Japanese Unexamined Patent Publication No. 2002-323683. Further, as the optical device utilizing the wavelength selector switch, it is possible to apply an optical system shown in FIG. 1A of U.S. Pat. No. 6,549,699 to realize a function equivalent to the plurality of 1×2 optical switches shown in FIG. 1. However, the optical device used in the present invention is not limited to the above specific examples.

According to the optical demultiplexing method and the optical multiplexing method of the present invention as described in the above, it is possible to arrange the signal lights having different modulating rates at the arbitrary wavelengths. Further, since the optical demultiplexing method and the optical multiplexing method of the present invention can be realized using only the existing optical device as shown in the configuration examples of FIG. 1 and FIG. 3, economically excellent optical demultiplexing method and optical multiplexing method are realized.

Next, there will be described an embodiment of an optical transmission system applied with the optical demultiplexing method and the optical multiplexing method according to the present invention.

Figure 4:
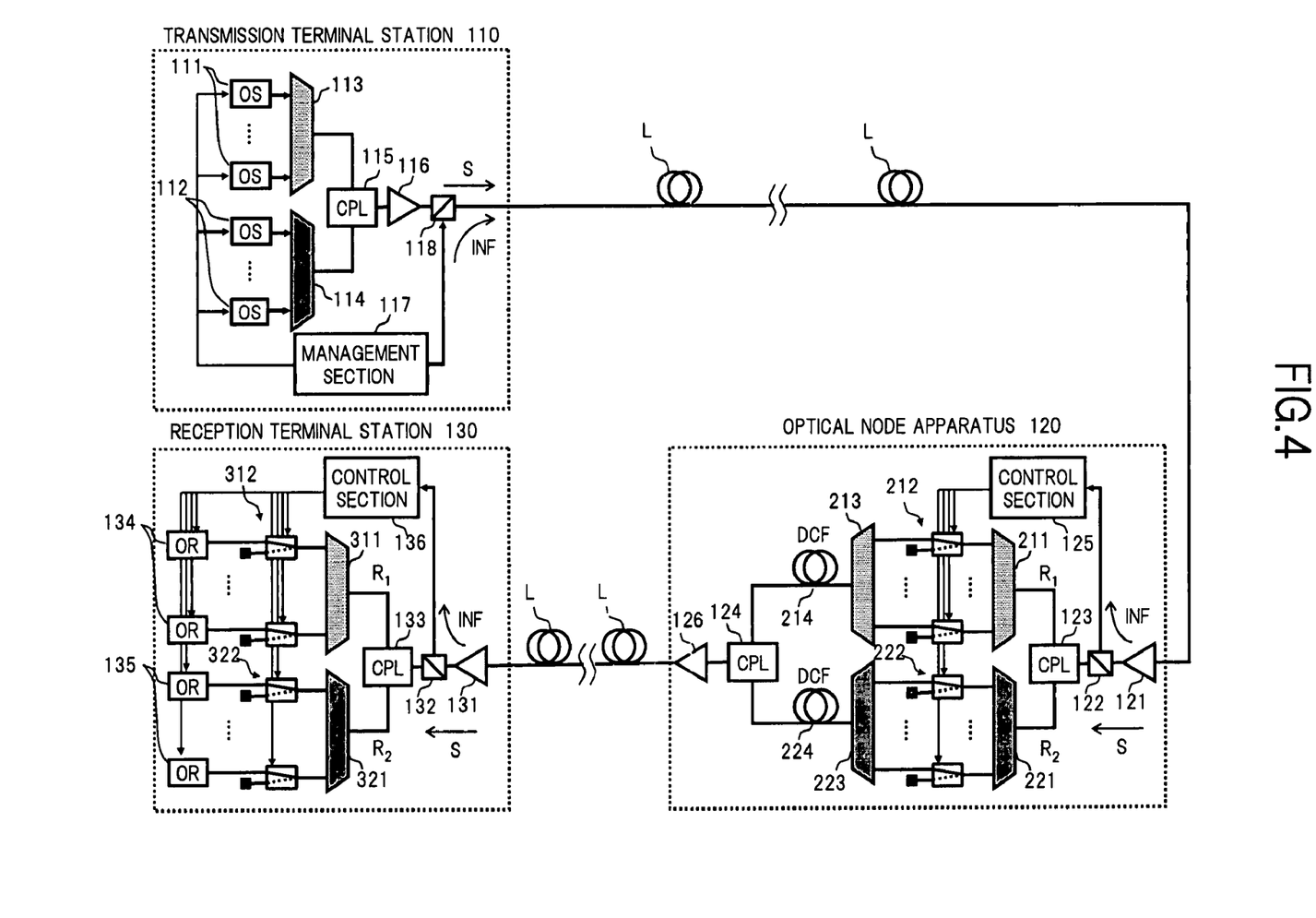
FIG. 4 is a diagram showing an entire configuration of one embodiment of an optical transmission system according to the present invention.

FIG. 4 is a diagram showing an entire configuration of one embodiment of the optical transmission system according to the present invention.

In FIG. 4, the present optical transmission system is such that, in a configuration same as that of a typical WDM optical transmission system shown in FIG. 13, a transmission terminal station 110 is configured by applying the optical multiplexing method of the present invention and also a reception terminal station 130 is configured by applying the optical demultiplexing method of the present invention, and further, an optical node apparatus 120 is configured by applying the optical demultiplexing method and the optical multiplexing method of the present invention.

The transmission terminal station 110 includes, for example, a plurality of optical senders (OS) 111 generating 10 Gbit/s signal lights corresponding to wavelength grids at 25 GHz intervals and a multiplexer 113 multiplexing the respective 10 Gbit/s signal lights. Further, the transmission terminal station 110 includes a plurality of optical senders (OS) 112 generating 40 Gbit/s signal lights which are arranged on the wavelength grids at 25 GHz intervals while maintaining 100 GHz intervals, and a multiplexer 114 multiplexing the respective 40 Gbit/s signal lights. The 10 Gbit/s signal lights multiplexed by the multiplexer 113 and the 40 Gbit/s signal lights multiplexed by the multiplexer 114 are multiplexed by an optical coupler 115, and thereafter, amplified by an optical post-amplifier 116 to be transmitted to an optical fiber transmission path L. Further, the transmission terminal station 110 includes a management section 117 that manages information related to operational wavelengths and bit rates of the respective signal lights contained in a WDM light S to be transmitted to the optical fiber transmission path L When the wavelengths and bit rates of the signal lights are changed, this management section 117 sends a control signal to each of the optical senders 111 and 112 to control a driving condition of each of the optical senders 111 and 112, and changes over an on/off condition of the signal light output from each of the optical senders 111 and 112. At the same time, the management section 117 has a function of generating a signal INF indicating the information related to the operational wavelengths and bit rates of the signal lights, to transmit the signal INF to the optical fiber transmission path L via a multiplexer 118 for transferring it to the downstream side.

The optical node apparatus 120 once separates, for example, the WDM light S propagated through the optical fiber transmission path L into a 10 Gbit/s signal light group and a 40 Gbit/s signal light group to perform the wavelength dispersion compensation for each signal light group, and thereafter, multiplexes the signal light groups to transmit the multiplexed light to the optical fiber transmission path L To be specific, the input light from the optical fiber transmission path L is amplified up to a required level by an optical amplifier 121, and thereafter, the amplified light is given to an optical coupler 123 via a demultiplexer 122. The optical coupler 123 is equivalent to the optical coupler 1 in FIG. 1. In the light branched into two by the optical coupler 123, the light sent to the route $R_1$ side passes through a 10 Gbit/s demultiplexer 211, a plurality of 1×2 optical switches 212, a 10 Gbit/s multiplexer 213 and a 10 Gbit/s dispersion compensation fiber (DCF) 214 in this sequence to be given to an optical coupler 124, while the light sent to the route $R_2$ side passes through a 40 Gbit/s demultiplexer 221, a plurality of 1×2 optical switches 222, a 40 Gbit/s multiplexer 223 and a 40 Gbit/s dispersion compensation fiber (DCF) 224 in this sequence to be given to the optical coupler 124. At this time, optical paths of the 1×2 optical switches 212 and 222 on the routes $R_1$ and $R_2$ are changed over in accordance with control signals from a control section 125. The control section 125 takes out, from the demultiplexer 122, the signal INF indicating the information related to the operational wavelengths and bit rates of the signal lights, which is transmitted from the upstream side via the optical fiber transmission path L, and generates the control signals for determining connection conditions of the optical paths of the 1×2 optical switches 212 and 222 in accordance with the information. The WDM light S which has been given to the optical coupler 124 and again multiplexed, is amplified up to a required level by an optical amplifier 126, and thereafter, is output to the optical fiber transmission path L.

The reception terminal station 130 amplifies the WDM light S propagated through the optical fiber transmission path L up to a required level by an optical pre-amplifier 131, and thereafter, gives the amplified light to an optical coupler 133 via a demultiplexer 132, to send two branched lights respectively to the routes $R_1$ and $R_2$. The light sent to the route $R_1$ side is demultiplexed by a 10 Gbit/s demultiplexer 311, and thereafter, the demultiplexed lights are received by 10 Gbit/s optical receivers (OR) 134 via 1×2 optical switches 312 corresponding to the respective demultiplexed lights. Further, the light sent to the route R2 side is demultiplexed by a 40 Gbit/s demultiplexer 321, and thereafter, the demultiplexed lights are received by 40 Gbit/s optical receivers (OR) 135 via 1×2 optical switches 322 corresponding to the respective demultiplexed lights. Optical paths of the 1×2 optical switches 312 and 322 on the routes $R_1$ and $R_2$ are changed over in accordance with control signals from a control section 136. The control section 136 takes out from the demultiplexer 132, the signal INF indicating the information related to the operational wavelengths and bit rates of the signal lights, which is transmitted from the upstream side via the optical fiber transmission path L, and generates the control signals for determining connection conditions of the optical paths of the 1×2 optical switches 312 and 322 in accordance with the information.

According to the optical transmission system as described in the above, the information related to the operational wavelengths and bit rates of the signal lights in the transmission terminal station 110 is transmitted to the optical node apparatus 120 on the optical fiber transmission path L and also to the reception terminal station 130, and the 1×2 optical switches in the optical node apparatus 120 and the reception terminal station 130 are controlled in accordance with the information. Thus, it becomes possible to transmit the WDM light S, in which the 10 Gbit/s signal lights and the 40 Gbit/s signal lights are arranged at arbitrary wavelengths on the wavelength grids at 25 GHz intervals, to the reception terminal station 130 from the transmission terminal station 110, while maintaining excellent signal qualities. Further, it is possible to perform the wavelength dispersion compensation for each of the 10 Gbit/s signal light group and the 40 Gbit/s signal light group in the optical node apparatus 120. Therefore, even if optimum values of wavelength dispersion compensation amount are different from each other depending on the bit rates of the signal lights, an optimum wavelength dispersion compensation amount can be given to each of the 10 Gbit/s signal lights and the 40 Gbit/s signal lights.

Figure 5:
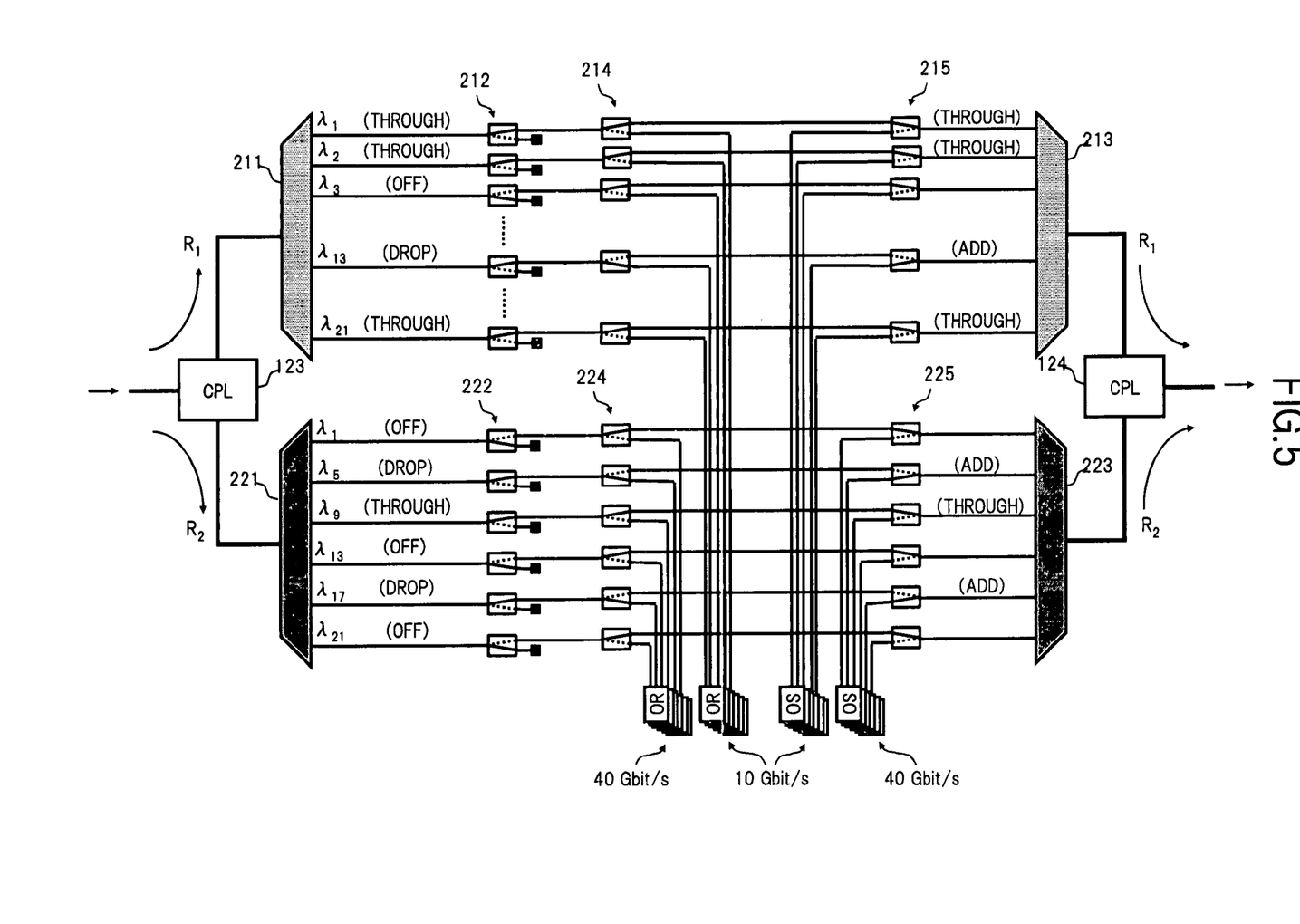
FIG. 5 is a diagram showing a configuration example for enabling the add/drop multiplexing of signal lights in an optical node apparatus used in the embodiment.

Note, in the above embodiment of the optical transmission system, one example has been shown in which the wavelength dispersion compensation is performed for each bit rate in the optical node apparatus 120. However, it is possible to perform the add/drop multiplexing on the signal lights of particular wavelengths, by applying a configuration as shown in FIG. 5 for example, to the routes $R_1$ and $R_2$ in the optical node apparatus 120. To be specific, in the configuration example of FIG. 5, on the assumption of the wavelength allocation of signal lights exemplarily shown in FIG. 2, the add/drop multiplexing on the signal lights of particular wavelengths is made possible, by further disposing 1×2 optical switches 214 and 224 and 2×1 optical switches 215 and 225, on the latter stage of the 1×2 optical switches 212 and 222 which control the transmission (through) and the block (off) of the signal lights on the routes $R_1$ and $R_2$. Although not shown in the figure here, each of the optical switches 212, 222, 214, 224, 215 and 225 is controlled by the control section in accordance with the information related to the operational wavelengths and bit rates transmitted from the transmission terminal station 110. In FIG. 5, the setting example of optical paths of the respective optical switches shown in the solid lines corresponds to the case where the 10 Gbit/s signal light of the wavelength block number 13 and the 40 Gbit/s signal lights of the wavelength block numbers 5 and 17 are subjected to the add/drop multiplexing at corresponding nodes, but the other signal lights are passed through corresponding nodes. Note, it is possible to appropriately determine whether or not optical senders (OS) and optical receivers (OR) are prepared for the wavelengths of the signal lights which are not subjected to the add/drop multiplexing at the corresponding nodes.

Further, in the above embodiment of the optical transmission system, one example has been shown, using the configuration of FIG. 1, in which the optical node apparatus 120 separates the WDM light to the 10 Gbit/s signal light group and the 40 Gbit/s signal light group. However, the configuration may be such that the WDM light is separated to each signal light group using the configuration in which the optical device utilizing the wavelength blocker, the wavelength selector switch or the like, as shown in FIG. 3, is disposed on each of the routes $R_1$ and $R_2$.

Figure 6:
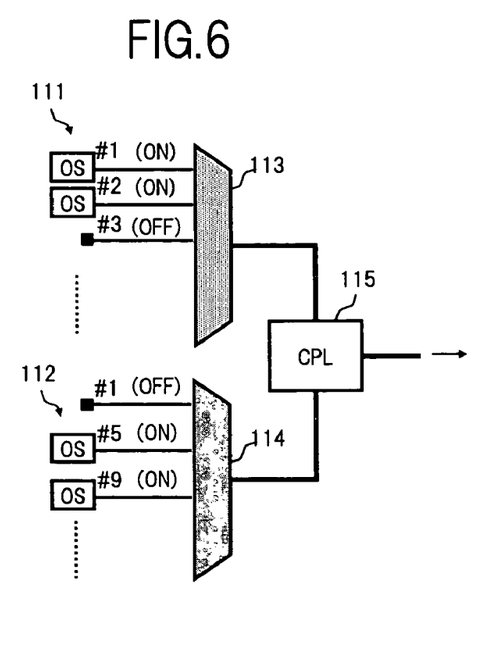
FIG. 6 is a diagram showing a modified example of a transmission terminal station used in the embodiment.
Figure 7:
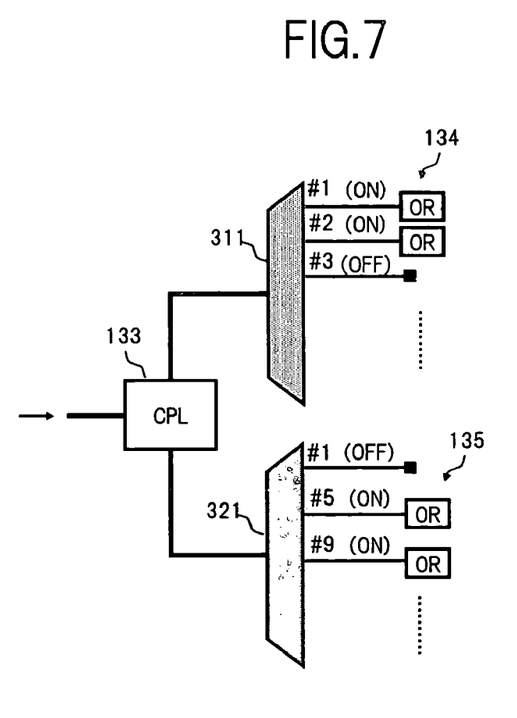
FIG. 7 is a diagram showing a modified example of a reception terminal station used in the embodiment.

Moreover, for the transmission terminal station 110, the description has been made on the case where the on/off of the optical senders 111 and 112 is changed over based on the control signal from the management section 117. However, as shown in FIG. 6 for example, the configuration may be such that the optical sender for the wavelength which is not used is removed and instead, an optical terminator is connected. In such a case, in order to cope with changes in the wavelengths and bit rates of the signal lights, the replacement of the optical sender with the optical terminator or the like are performed. Further, similarly to the transmission terminal station 110, for the reception terminal station 130, as shown in FIG. 7 for example, the configuration may be such that the optical receiver for the wavelength which is not used is removed and instead, an optical terminator is connected.

Figure 8:
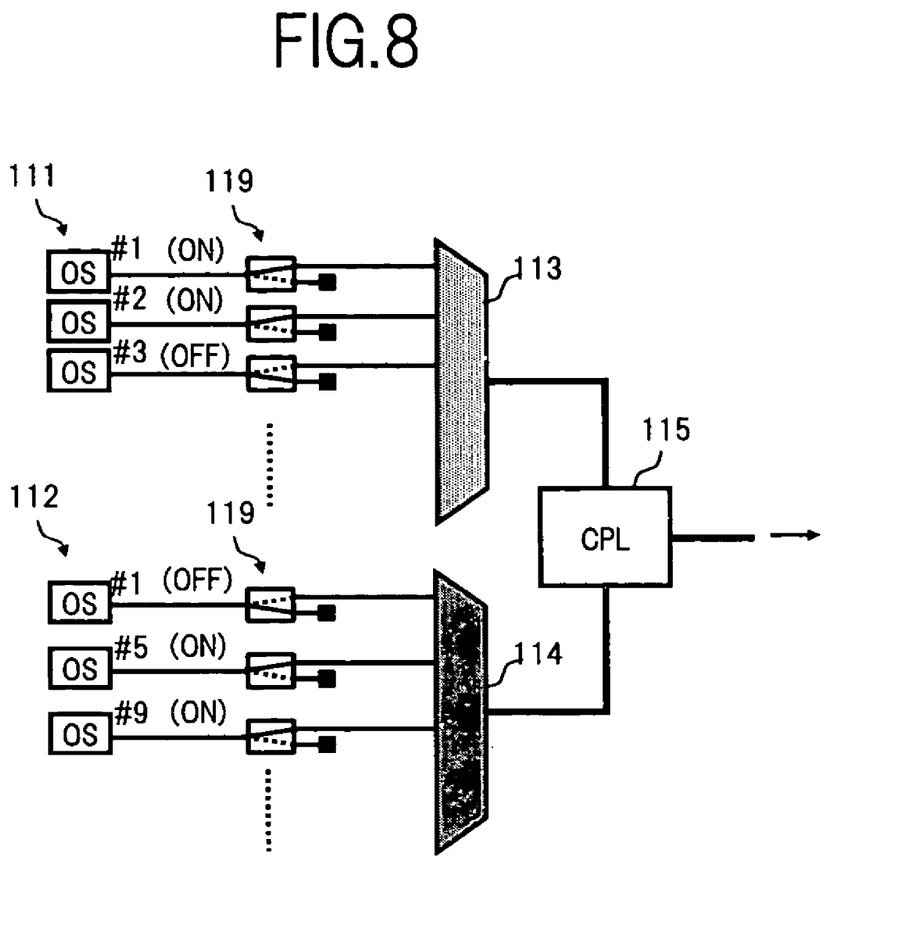
FIG. 8 is a diagram showing another modified example of the transmission terminal station used in the embodiment.

In addition, for the transmission terminal station 110, as shown in FIG. 8 for example, it is possible to apply a configuration in which 1×2 optical switches 119 are inserted to output ends of the optical senders 111 and 112, and changing-over-operations of the respective 1×2 optical switches 119 are controlled in accordance with the control signals from the management section (not shown in the figure here).

Next, a preferable application example of the above described optical node apparatus which performs the wavelength dispersion compensation individually for each bit rate.

Figure 9:
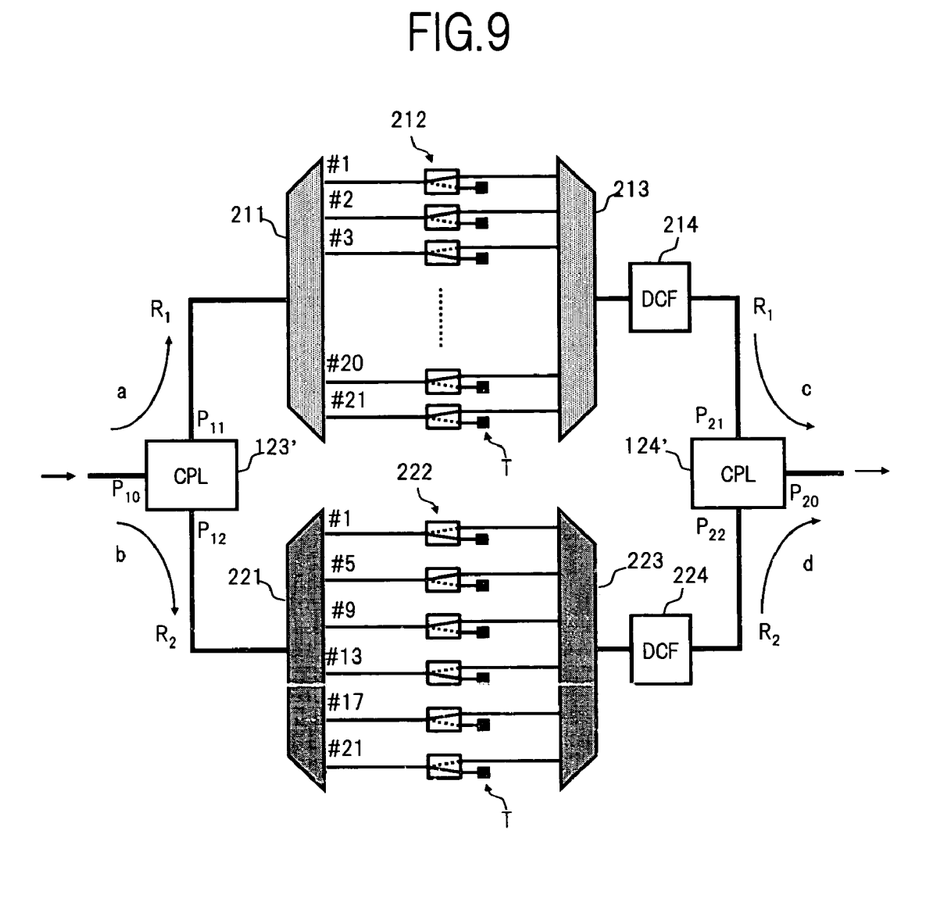
FIG. 9 is a diagram showing an application example of the optical node apparatus used in the embodiment.

FIG. 9 is a diagram showing a main part configuration of the optical node apparatus according to the application example.

In FIG. 9, the present optical node apparatus is characterized in that a branching ratio between ports $P_{11}$, and $P_{12}$ of an optical coupler 123' which branches an input light into two, can be set at an arbitrary ratio a:b which is not necessarily 1:1, so that the power of the signal light input to each of the dispersion compensation fibers 214 and 224 can be set at a different value for each bit rate. Further, similarly to this, a branching ratio between ports $P_{21}$ and $P_{22}$ of an output side optical coupler 124' which multiplexes the output lights from the respective dispersion compensation fibers 214 and 224, can be set at an arbitrary ratio c:d.

Generally, an upper limit value of the signal light power, which may be input to a dispersion compensation fiber, is often different depending on a bit rate of a signal light, in terms of the system design. This is because it is necessary to lower the signal light power to suppress the signal light phase modulation generated in the dispersion compensation fiber as much as possible, since the signal light is easy to be influenced by the wavelength dispersion, the higher the bit rate is. Therefore, by designing in optimum the branching ratio a:b of the input side optical coupler 123' according to the upper limit value of the signal light power corresponding to each bit rate of the routes $R_1$ and $R_2$, it becomes possible to suppress the generation of the signal light phase modulation in each of the dispersion compensation fibers 214 and 224.

Further, by setting the branching ratio of the input side optical coupler 123' at the arbitrary ratio a:b as described in the above, there are caused level differences in the powers in the signal lights at respective bit rates, which pass through the respective dispersion compensation fibers 214 and 224 to be multiplexed by the output side optical coupler 124'. If the WDM light in which the level differences are caused is amplified by the optical amplifier to be output to the optical fiber transmission path L, there is caused a possibility that a transmission characteristic of the WDM light is deteriorated. Therefore, also the branching ratio c:d of the output side optical coupler 124' is designed so that the power of the WDM light output to the optical fiber transmission path L is optimized, to prevent the deterioration of the transmission characteristic.

Note, here, the branching ratio of the optical coupler 123' is set at the arbitrary ratio which is not necessarily 1:1 so that the optimization of the signal light power at each bit rate is achieved. However, the configuration may be such that the branching ratio of the optical coupler is set at 1:1 for example, so that the power of each signal light after branched is optimized using a loss medium or an amplification medium. In connection with this, the optimum designing of the branching ratio of the optical coupler is advantageous in terms of the less deterioration in an S/N ratio of the signal light.

Figure 10:
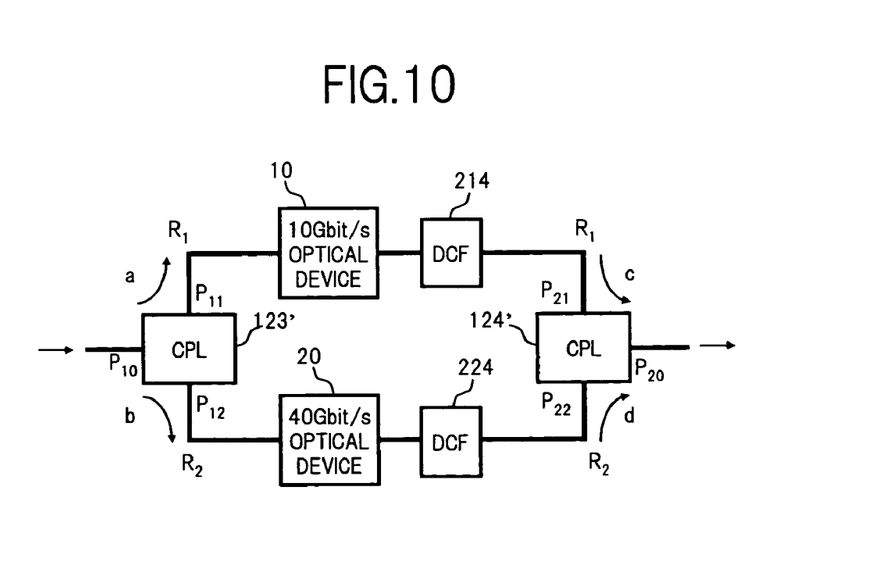
FIG. 10 is a diagram showing another configuration example related to FIG. 9.

Further, the application example of the optical node apparatus as described in the above is surely effective for the configuration shown in FIG. 3 applied with the optical devices 10 and 20 each utilizing the wavelength blocker, the wavelength selector switch or the like. A configuration example in such a case is shown in FIG. 10.

Next, there will be described another application example of the optical node apparatus according to the present invention.

In the optical node apparatus as described in the above, although it is possible to arrange the 10 Gbit/s signal lights at arbitrary wavelengths on the wavelength grids at 25 GHz intervals, the 40 Gbit/s signal lights need to be maintained at 100 GHz intervals or more considering the spectral expansion thereof. Therefore, the wavelengths at which the 40 Gbit/s signal lights can be arranged are restricted to the wavelength grid numbers 1, 5, 9, 13, 17, 21 and the like, for example. Here, the description will be made on an application example in which the 40 Gbit/s signal lights can also be arranged at arbitrary wavelengths on the wavelength grids at 25 GHz intervals.

Figure 11:
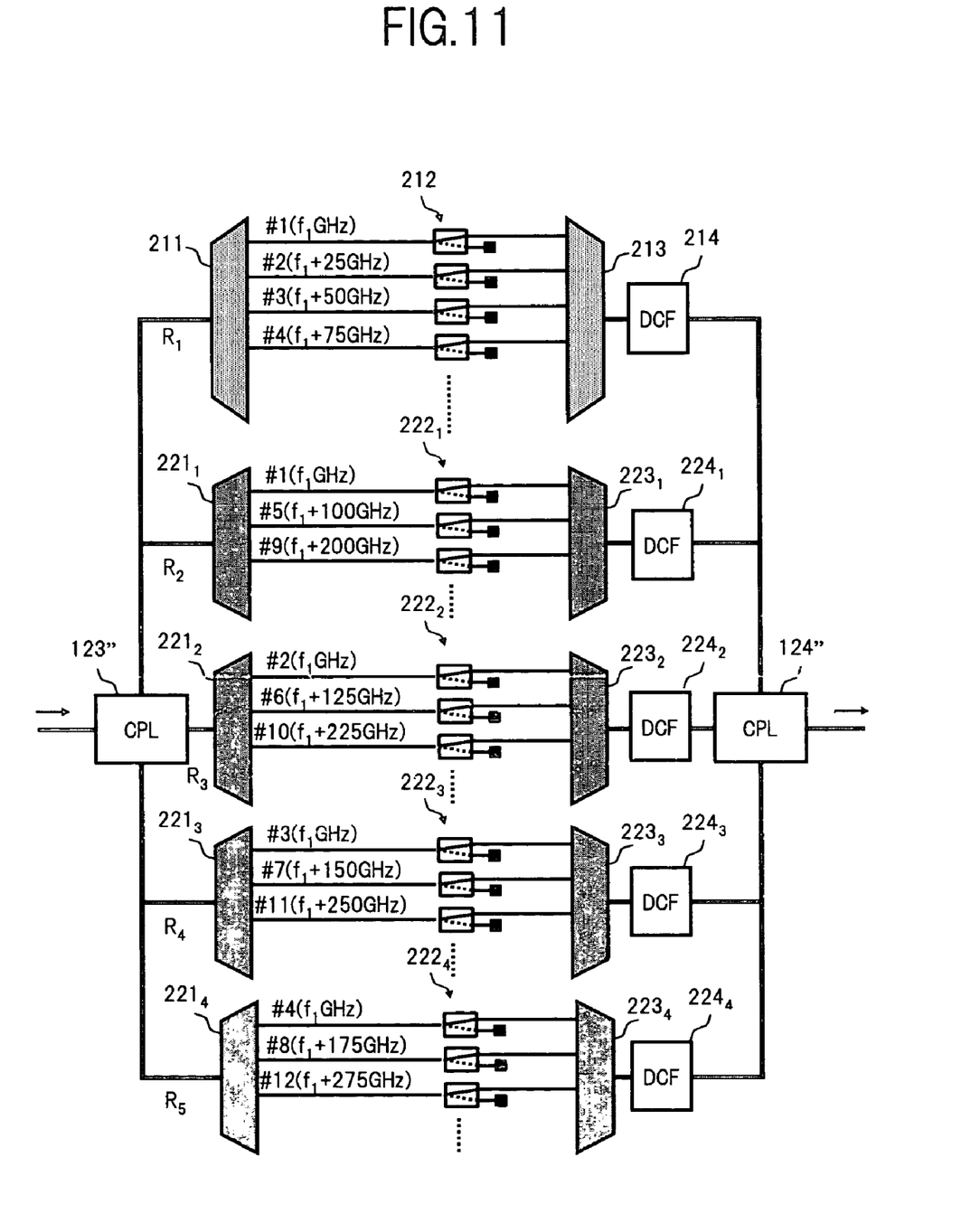
FIG. 11 is a diagram showing another application example of the optical node apparatus used in the embodiment.

FIG. 11 is a diagram showing a main part configuration of an optical node apparatus according to the application example.

In FIG. 11, the present optical node apparatus branches an input light to five routes $R_1$ to $R_5$ by an optical coupler 123", to allocate one route $R_1$ as a route for the 10 Gbit/s signal lights and four routes $R_2$ to $R_5$ as routes for the 40 Gbit/s signal lights, and again multiplexes signal lights which have passed through the respective routes $R_1$ to $R_5$ to be subjected to the wavelength dispersion compensation for each bit rate, by an optical coupler 124".

Figure 12:
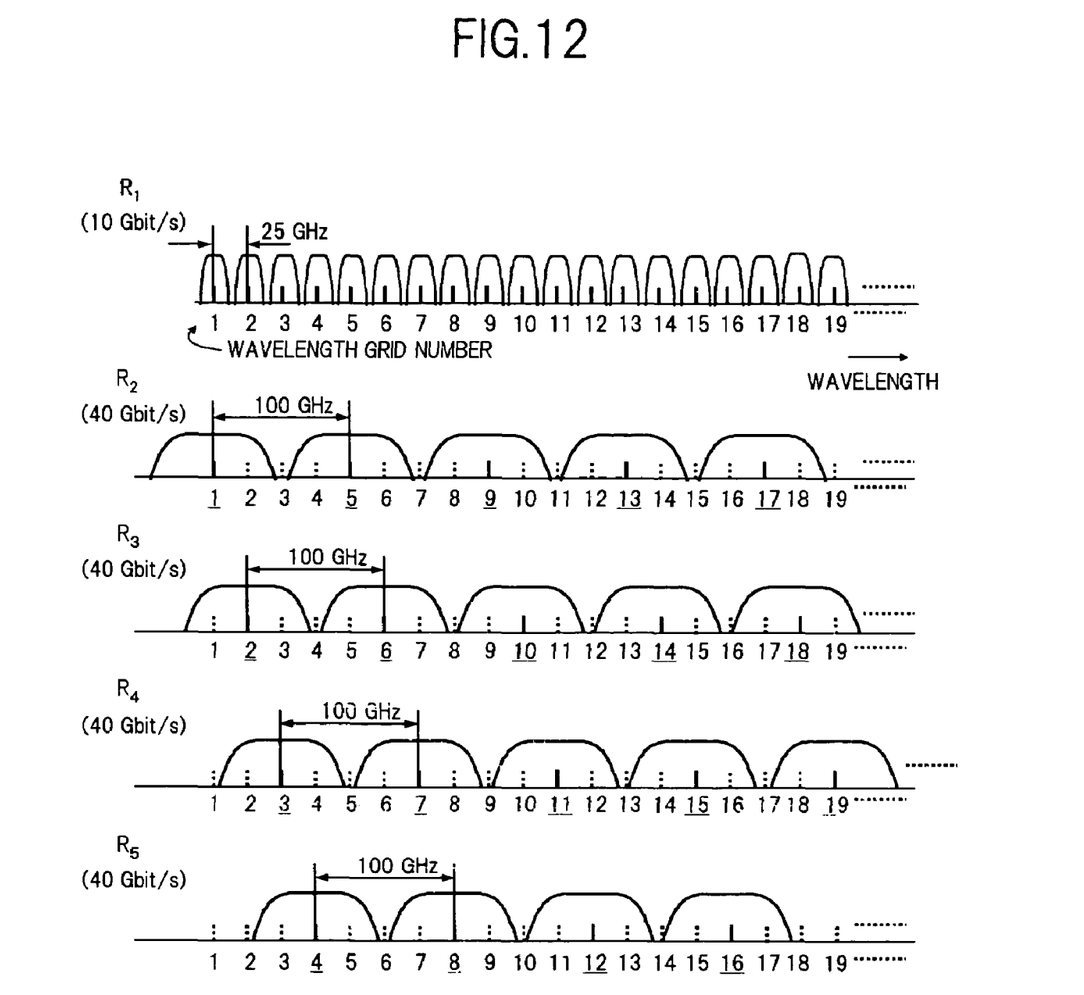
FIG. 12 is a diagram showing transmission bands of demultiplexers and multiplexers on respective routes in the configuration of FIG. 11.

The demultiplexer 211 arranged on the route $R_1$, the plurality of 1×2 optical switches 212, the multiplexer 213 and the dispersion compensation fiber 214, each for the 10 Gbit/s signal lights, are the same as those in the above embodiment. On the other hand, as shown in FIG. 12 for example, demultiplexers 221$_1$ to 221$_4$ and multiplexers 223$_1$ to 223$_4$ respectively arranged on the routes $R_2$ to $R_5$ for the 40 Gbit/s signal lights are previously set so that the center wavelengths (frequencies) in transmission bands thereof are shifted to each other by 25 GHz, and the demultiplexer and the multiplexer whose transmission bands are coincident with each other are connected via a plurality of 1×2 optical switches. Note, as dispersion compensation fibers 224$_1$ to 224$_4$ on the routes $R_2$ to $R_4$, there are used common dispersion compensation fibers whose wavelength dispersion compensation amounts for the 40 Gbit/s signal lights are optimized.

By applying the configuration as described in the above, even if the 40 Gbit/s signal light is arranged at any wavelength on the wavelength grids at 25 GHz intervals, there exist the demultiplexer and the multiplexer each having the transmission band whose center wavelength is coincident with the wavelength of the 40 Gbit/s signal light. Therefore, by changing over optical paths of 1×2 optical switches 222$_1$ to 222$_4$ on the routes $R_2$ to $R_5$ corresponding to the wavelength allocation of the 40 Gbit/s signal lights, the multiplexing/demultiplexing of the 40 Gbit/s signal lights can be performed. To be specific, here, the 40 Gbit/s signal lights arranged on the wavelength grid numbers 1($f_1$ GHz), 5($f_1$+100 GHz), 9($f_1$+200 GHz) . . . pass through the route $R_2$, and the 40 Gbit/s signal lights arranged on the wavelength grid numbers 2($f_1$+25 GHz), 6($f_1$+125 GHz), 10($f_1$+225 GHz) . . . pass through the route R3. Further, the 40 Gbit/s signal lights arranged on the wavelength grid numbers 3($f_1$+50 GHz), 7($f_1$+150 GHz), 11($f_1$+250 GHz) . . . pass through the route R4, and the 40 Gbit/s signal lights arranged on the wavelength grid numbers 4($f_1$+75 GHz), 8($f_1$+175 GHz), 12($f_1$+275 GHz) . . . pass through the route $R_5$. Accordingly, it becomes possible to arrange not only the 10 Gbit/s signal lights but also the 40 Gbit/s signal lights at arbitrary wavelengths on the wavelength grids at 25 GHz intervals.

Note, the application example of the optical node apparatus which performs the wavelength dispersion compensation has been shown here. However, it is possible to apply the present invention to an optical node apparatus which performs the add/drop multiplexing on the signal lights. Further, it is also effective to apply the above described configuration not only to the optical node apparatus but also to the transmission terminal station and the reception terminal station. Further, in the above description, one example has been shown in which the 10 Gbit/s signal lights and the 40 Gbit/s signal lights mixedly exist on the wavelength grids at 25 GHz intervals. However, the intervals of the wavelength grids and the modulating rates of the signal lights are not limited thereto.

What is claimed is:

1. An optical transmission apparatus transmitting a wavelength division multiplexed light containing a plurality of signal lights having different modulating rates which are arranged on wavelength grids at predetermined intervals, comprising:

a demultiplexing section comprising:
an optical coupler branching said wavelength division multiplexed light to send the branched lights to a plurality of routes respectively corresponding to said different modulating rates;
a plurality of demultiplexers respectively demultiplexing the lights sent to the plurality of routes by said optical coupler in accordance with transmission bands whose center wavelengths are set on said wavelength grids while maintaining intervals corresponding to modulating rates of said routes;
a plurality of optical switches connected to respective output ports of said demultiplexers; and
a control section that changes over optical paths on said plurality of optical switches according to the setting of wavelengths and modulating rates of the respective signal lights contained in said wavelength division multiplexed light, to transmit the signal lights having the modulating rates corresponding to said demultiplexers but to block the signal lights having other modulating rates, among the signal lights output from the respective output ports of said plurality of demultiplexers; and a multiplexing section comprising:
a plurality of multiplexers respectively multiplexing said plurality of signal lights sent to a plurality of routes respectively corresponding to said different modulating rates in accordance with transmission bands whose center wavelengths are set on said wavelength grids while maintaining intervals corresponding to modulating rates of said routes;
an input control section that gives only the signal lights having the modulating rates corresponding to said multiplexers to respective input ports of said multiplexers; and
an optical coupler further multiplexing the lights respectively multiplexed by said plurality of multiplexers.

2. An optical transmission apparatus according to claim 1, wherein said wavelength division multiplexed light propagated through an optical fiber transmission path is given to said demultiplexing section, and the signal lights of respective wavelengths demultiplexed in said demultiplexing section are again multiplexed in said multiplexing section to be sent to said optical fiber transmission path, and also there is provided a node processing section that performs the previously set processing on the signal lights being propagated through the respective routes between the optical coupler in said demultiplexing section and the optical coupler in said multiplexing section.

3. An optical transmission apparatus according to claim 2, wherein said node processing section performs the add/drop multiplexing on the signal lights of previously set wavelengths and modulating rates.

4. An optical transmission apparatus according to claim 2, wherein said node processing section performs the wavelength dispersion compensation on signal light groups demultiplexed for each of the different modulating rates corresponding to the modulating rates of said signal light groups.

5. An optical transmission apparatus according to claim 4, wherein said node processing section includes a plurality of dispersion compensation fibers inserted to the respective routes between the plurality of multiplexers in said multiplexing section and the optical coupler in said multiplexing section, and a branching ratio of said optical coupler in said demultiplexing section is set so that the signal light power input to each of said dispersion compensation fibers becomes smaller than a previously set upper limit value.

6. An optical transmission apparatus according to claim 5, wherein a branching ratio of the optical coupler in said multiplexing section is set based on the setting of the branching ratio of the optical coupler in said demultiplexing section.

7. An optical transmission apparatus according to claim 2, wherein in place of said demultiplexers, said plurality of optical switches and said multiplexers respectively arranged on said plurality of routes, optical devices each capable of selecting the signal lights of arbitrary wavelengths out of the plurality of signal lights sent to said respective routes to output them as a wavelength division multiplexed light, are arranged on said respective routes.

8. An optical transmission apparatus according to claim 7, wherein said optical device includes a wavelength blocker.

9. An optical transmission apparatus according to claim 7, wherein said optical device includes a wavelength selector switch.

10. An optical transmission apparatus according to claim 1, wherein said wavelength division multiplexed light propagated through an optical fiber transmission path is given to said demultiplexing section, and the respective signal lights demultiplexed in said demultiplexing section are received to be processed by optical receivers corresponding to respective wavelengths and modulating rates of the respective signal lights.

11. An optical transmission apparatus according to claim 1, wherein the plurality of signal lights of different wavelengths and different modulating rates output from a plurality of optical senders are given to said multiplexing section, and a wavelength division multiplexed light multiplexed in said multiplexing section is transmitted to an optical fiber transmission path.

12. An optical transmission apparatus according to claim 1, wherein said plurality of signal lights contain 10 Gbit/s signal lights capable to be arranged at arbitrary wavelengths on wavelength grids at 25 GHz intervals, and 40 Gbit/s signal lights capable to be arranged on the wavelength grids at 25 GHz while maintaining at least 100 GHz intervals.

13. An optical transmission apparatus according to claim 12,
wherein said plurality of routes respectively corresponding to said different modulating rates include one route corresponding to 10 Gbit/s and four routes corresponding to 40 Gbit/s, and center frequencies in the respective transmission band of said demultiplexers and said multiplexers respectively arranged on the routes corresponding to 40 Gbit/s are set to be shifted to each other by 25 GHz.

14. An optical transmission apparatus for transmitting a wavelength division multiplexed light containing a plurality of signal lights having different modulating rates which are arranged on wavelength grids at predetermined intervals, comprising:

an optical coupler branching said wavelength division multiplexed light to send the branched lights to a plurality of routes respectively corresponding to said different modulating rates;

a plurality of demultiplexers respectively demultiplexing the lights sent to the plurality of routes by said optical coupler in accordance with transmission bands whose center wavelengths are set on said wavelength grids while maintaining intervals corresponding to modulating rates of said routes;

a plurality of optical switches connected to respective output ports of said demultiplexers; and a control section that changes over optical paths on said plurality of optical switches according to the setting of wavelengths and modulating rates of the respective signal lights contained in said wavelength division multiplexed light, to transmit the signal lights having the modulating rates corresponding to said demultiplexers but to block the signal lights having other modulating rates, among the signal lights output from the respective output ports of said plurality of demultiplexers.

* * * * *